June 9, 1964  O. N. BRYANT  3,136,326

SPEED SENSING APPARATUS

Filed Sept. 12, 1960  2 Sheets-Sheet 1

INVENTOR
OZRO N. BRYANT
BY Frank Critians Jr.

June 9, 1964     O. N. BRYANT     3,136,326
SPEED SENSING APPARATUS
Filed Sept. 12, 1960     2 Sheets-Sheet 2

INVENTOR
OZRO N. BRYANT

United States Patent Office 3,136,326
Patented June 9, 1964

3,136,326
SPEED SENSING APPARATUS
Ozro N. Bryant, Chester, Pa., assignor to Westinghouse Electric Corporation, East Pittsburgh, Pa., a corporation of Pennsylvania
Filed Sept. 12, 1960, Ser. No. 55,419
3 Claims. (Cl. 137—36)

This invention relates to apparatus for obtaining a fluid pressure signal indicative of the rotational speed of a rotating element such as a rotor or shaft, and has for an object to provide apparatus of the above type in which the signal varies substantially as a linear function of the speed from nearly zero speed to maximum speed.

It is another object of the invention to provide apparatus for obtaining a fluid pressure signal indicative of rotational speed of a rotating element, in which the fluid pressure signal obtained may either rise with increase in speed or fall with increase in speed, as desired, and in which the fluid pressure signal is of a substantially high magnitude, thereby not requiring amplification of the signal in order to operate the usual fluid pressure actuated controls.

Yet another object of the invention is to provide fluid actuated apparatus for detecting the direction of rotation as well as the rotational speed of a rotating element in a simple yet effective manner.

A still further object of the invention is to provide a fluid actuated speed governor for controlling the speed of a rotating shaft or element throughout a wide range, with a high degree of reliability.

It is known that a high velocity jet of fluid such as oil, water, or air will cause an impact pressure if the jet is caused to strike an inlet in a receiver plate. In accordance with the invention, there is provided apparatus for obtaining a fluid pressure signal varying with the rotational speed of a rotating element comprising a single nozzle member disposed in spaced registry with an inlet formed in an impact receiver plate. The nozzle is supplied with a pressurized fluid which is ejected therefrom in the form of a free jet toward the inlet.

A disc member driven by the rotating element, the speed of which is to be detected or controlled, is interposed between the nozzle and the impact receiver plate inlet. The disc member has an annular series of equally spaced fluid deflecting elements such as thin radially extending vanes. Between the vanes an annular series of equally spaced fluid passages are thus formed, and during rotation of the disc member at any speed the vanes and passages are movable transversely across the path of the fluid jet between the nozzle and the receiver inlet, so that the jet is alternately deflected by the vanes and permitted to strike the receiver inlet to a greater or lesser degree, depending upon the speed of movement of the vanes past the free jet.

Accordingly, as the speed of the rotating disc is varied, the degree of interruption of flow from the nozzle to the impact receiver inlet is also varied, thereby varying the impact pressure in the receiver plate. The receiver plate is further provided with means defining a passageway connecting the inlet to any suitable pressure responsive device. If it is desired to control the speed of a prime mover at a preselected value, a pressure responsive relay valve mechanism may be employed. As well known in the art, the relay valve mechanism may be employed to control and regulate the pressure of the control fluid to a servomotor or the like, which in turn controls flow of motive fluid to the prime mover. When the prime mover is a steam turbine, for example, the servomotor is employed to control the steam governor valves, thereby regulating the rotary speed of the turbine rotor. However, the speed responsive fluid pressure signal obtained with the apparatus may be employed for controlling the speed of any type of rotating machine.

The invention is susceptible of many modifications. For example, by arranging the vanes in parallel relation with the free jet formed by the nozzle, the impact pressure obtained in the impact receiver will decrease with increase in rotational speed of the disc member. On the other hand, by skewing the vanes so that their leading edges are disposed forwardly of their trailing edges relative to the direction of movement of the disc member, while maintaining the nozzle and impact receiver inlet in the position wherein the direction of the free jet is substantially parallel to the axis of rotation of the disc member, the impact pressure obtained at the receiver will increase with increase in rotational speed.

With this latter arrangement, the direction of rotation of the disc member may also be detected, since when the disc member rotates in one direction the impact pressure increases with increase in speed, as mentioned above; while when the direction of rotation of the disc member is reversed, the impact pressure will decrease with increase in speed.

The foregoing and other objects are effected by the invention as will be apparent from the following description and claims taken in connection with the accompanying drawings, forming a part of this application, in which:

Figure 9:
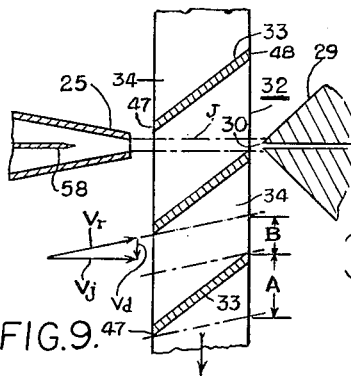
FIGS. 9 and 10 are views similar to FIGS. 6 and 7 but showing another embodiment.
Figure 10:
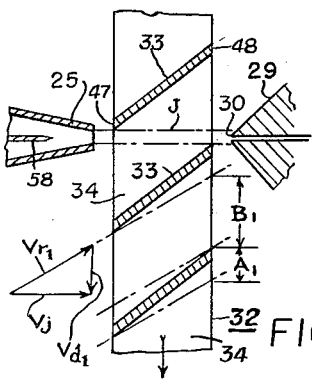
Figure 12:
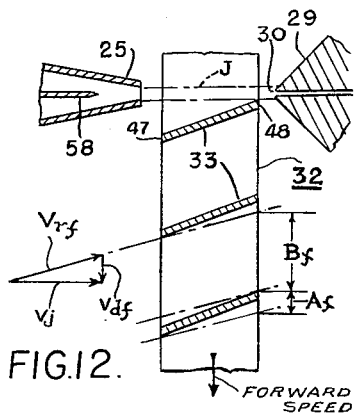
Figure 13:
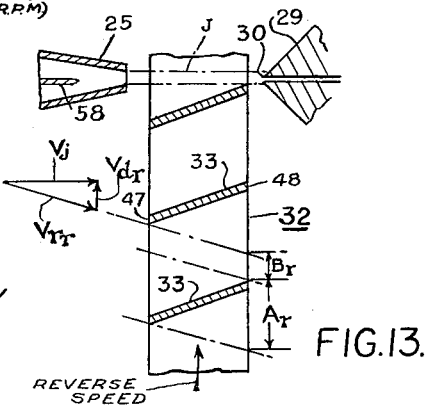
Figure 14:
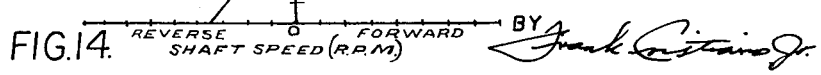

FIGS. 12 and 13 are views similar to FIGS. 9 and 10 but further showing vectorial triangles obtained with the disc rotating in forward and reverse directions, respectively; and, FIG. 14 is a chart showing a representative curve obtained with the embodiment shown in FIGS. 12 and 13.

Figure 1:
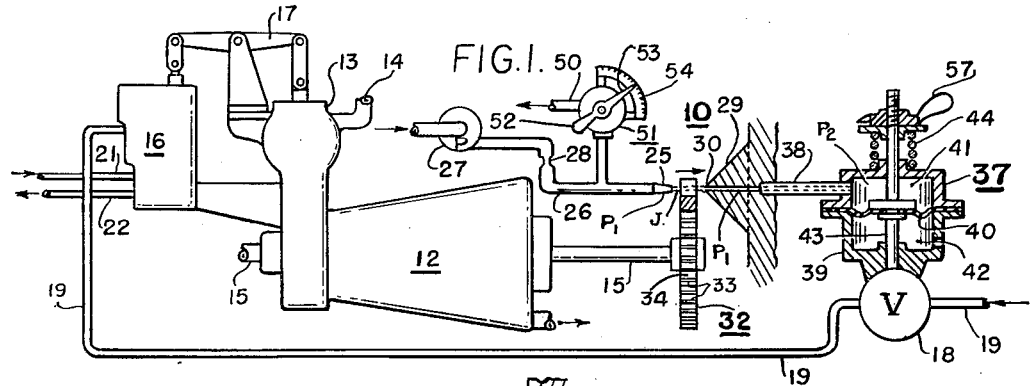
FIG. 1 is a schematic view of a speed governor system for a steam turbine unit employing a speed sensing mechanism incorporating the invention.

Referring to FIG. 1 of the drawings, there is shown schematically speed sensing apparatus 10 formed in accordance with the invention and incorporated in a system for controlling the rotational speed of a prime mover such as a steam turbine 12. The steam turbine 12 in provided with the usual governing valve mechanism 13 for regulating the flow of motive steam from a steam inlet conduit 14 to the turbine, as required to maintain the rotational speed of its power output shaft 15 at a preselected speed with varying load. The governing valve may be controlled by a suitable fluid actuated servomotor 16 operatively connected thereto by a linkage mechanism 17. Control fluid at varying pressure proportionate to the speed of the turbine shaft 15 is regulated by a valve member 18 interposed in a high pressure fluid conduit 19 fed from a suitable source of high pressure hydraulic fluid, for example, oil (not shown). The control fluid from conduit 19 serves to pilot the servomotor 16 and regulate admission of high pressure oil to the servomotor 16 through a high pressure oil conduit 21. As well known in the art, high pressure oil is admitted to the servomotor 16 through the high pressure conduit 21 and trapped oil is bled through conduit 22, as required, to effect movement of the governing valve mechanism 13 in opening or closing direction.

In accordance with the invention, the speed sensing apparatus 10 comprises a nozzle member 25 supplied with high pressure fluid from a suitable source (not shown) by a conduit 26. Preferably, a liquid such as oil is employed. Interposed in the conduit 26 is a pump 27 for maintaining a uniform pressure in the conduit 26 and a restricted orifice 28 may be provided downstream of the pump to maintain the pressure of the fluid downstream thereof at a substantially uniform value. A fluid impact receiver member 29 is provided with an inlet opening 30 disposed in spaced registry or alignment with the nozzle 25, so that flow from the nozzle 25 extends across the space therebetween in the form of a free jet J and impinges or penetrates into the inlet opening 30, thereby creating an impact pressure $P_2$ which is on the order of about 90 percent of the value of the nozzle pressure $P_1$. Interposed between the nozzle 25 and the inlet opening 30 of the receiver, there is provided a disc member 32 which is rotatably carried by the turbine output shaft 15, so that the rotational speed of the disc 32 is equal to the rotational speed of the turbine output shaft 15.

Figure 3:
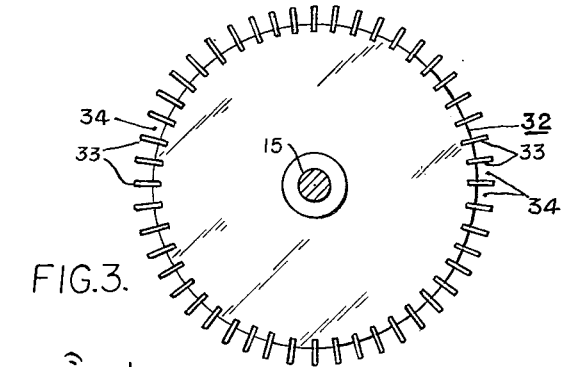
FIG. 3 is an end view of the vaned disc member shown in FIG. 1, taken on a larger scale.

The disc member 32 may be of any suitable diameter and, as best shown in FIG. 3, is provided with an annular array of spaced vanes 33 disposed in fixed relation about its circumferential periphery. The vanes 33 are equally spaced from each other so that an annular array of passageways 34 are also provided therebetween. The vanes 33 are relatively thin in cross section with respect to their pitch or spacing and, in this embodiment, are disposed in radial planes.

Figure 2:
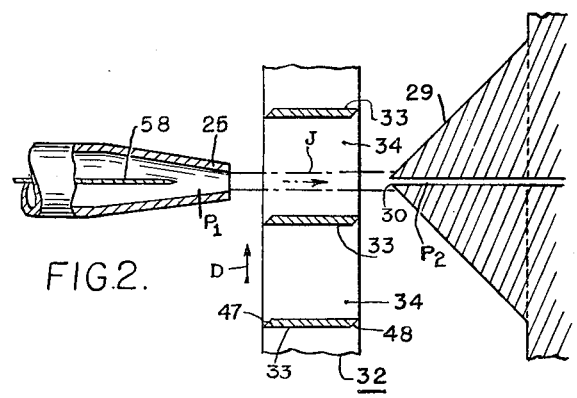
FIG. 2 is an enlarged fragmentary portion of the speed sensing mechanism shown in FIG. 1, with portions shown in section to more clearly show the invention.

As best shown in FIGS. 1 and 2, the disc member 32 is interposed in the space between the nozzle 25 and the inlet opening 30, and the path of flow of the free jet is substantially parallel to the axis of rotation of the disc member 32. Hence, as the disc member is rotated at any speed in the direction of the arrow D, the free jet issuing from the nozzle 25 is deflected from its course by the vanes 33 as they move across the jet and is permitted to flow into the impact receiver inlet 30 by the passageways 34, in an alternating pattern. The frequency of interruption and length of period of such interruption is a function of the linear speed of the vanes 33 past the free jet. Accordingly, although the pressure $P_2$ is a fluctuating pressure the average impact fluid pressure $P_2$ obtainable at the receiver inlet 30 will vary with linear speed of the vanes 33, which, in turn, is a function of the rotational speed of the turbine shaft 15. Hence, the fluid pressure signal $P_2$ varies with the rotational speed of the turbine shaft 15. Hereafter, the $P_2$ pressure will be understood to be the average pressure.

The speed responsive fluid pressure signal $P_2$ may be applied to a suitable pressure responsive mechanism 37 by a fluid passage defining means such as a conduit 38. The pressure responsive mechanism 37 may be of any suitable type. However, as illustrated, it is provided with a casing 39 having a movable abutment such as a diaphragm 40 disposed therein and dividing the body into upper and lower chambers 41 and 42. The conduit 38 is connected to upper chamber 41 while the lower chamber 42 may be vented to the atmosphere. A rod 43 is slidably supported in the casing 39 and is connected to the diaphragm 40 and biased in upward direction by a spring member 44 against the pressure $P_2$ in the chamber 41.

The pressure responsive mechanism 37 may be employed to control the position of the valve 18, previously described, so that the valve may be moved in opening or closing direction by movement of the rod 43. The valve 18 may be either of the normally open type and movable in closing direction by downward movement of the rod 43, or, conversely, it may be of the normally closed type and movable in opening direction by downward movement of the rod member 43, depending upon the specific characteristics of the servomotor 16, as well known in the art.

Figure 4:
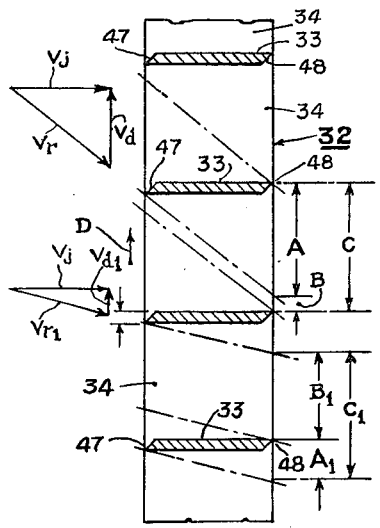
FIG. 4 is a fragmentary development of the disc member with high and low speed vectorial triangles.

FIG. 4 shows a vectorial analysis and a diagrammatic analysis of the characteristics of the speed sensing mechanism 10. Assuming the free jet J to have a velocity and direction indicated by the vector $V_j$ and the disc to have a linear velocity and direction at one speed indicated by the vector $V_d$, the velocity and direction of the free jet relative to the moving disc is obtained by closing the triangle, thereby obtaining the vector $V_r$. By drawing lines parallel to the vector $V_r$ at the leading edges 47 and the trailing edges 48 of the vanes 33, it will be noted that the jet is interrupted for a distance A and permitted to flow for a distance B, where $A+B=$ the pitch or spacing C between neighboring vanes 33. With the disc speed $V_d$, the jet is interrupted for about ⅞ of the pitch C and permitted to flow for about ⅛ of the pitch C. Accordingly, a ratio $$\frac{B}{A+B}$$

is attained, which ratio is proportional to the average pressure $P_2$ attained in the impact receiver 29. In this example, the ratio is ⅛.

When the disc speed is at a lower value (about ⅓ $V_d$) as shown by the vector $V_{d1}$ and the jet velocity $V_j$ is unchanged, the relative velocity of the jet to the disc is $V_{r1}$. By drawing lines parallel to $V_{r1}$ in the same manner as above, it will be noted that the jet interruption period $A_1$ is decreased and the jet flow period $B_1$ is increased. In this example $B_1$ equals about ¾ of the pitch C while $A_1$ equals about ¼ of the pitch C, for a ratio of ¾.

From the above it will be seen that low disc velocity gives a high ratio of $$\frac{B_1}{A_1+B_1}$$

and hence, a high pressure $P_2$ in the impact receiver while, conversely, a high disc velocity gives a low ratio of $$\frac{B}{A+B}$$

and hence a low pressure $P_2$.

Figure 5:
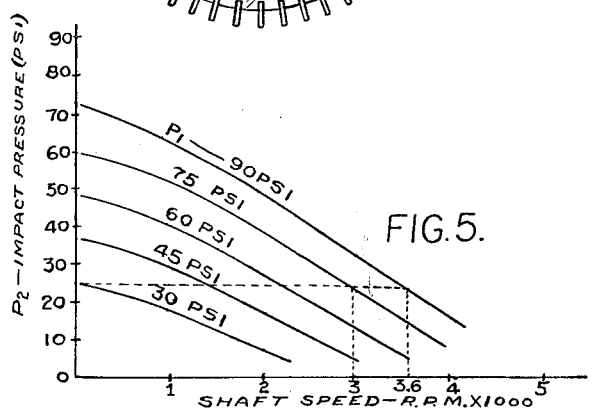
FIG. 5 is a chart plotting shaft speed in r.p.m. as abscissa against impact pressure in p.s.i. as ordinates.

IN FIG. 5 there is shown a chart showing shaft speed in r.p.m. as abscissa and impact pressure $P_2$ in p.s.i. as ordinates and having a plurality of curves obtained with different nozzle pressures values $P_1$. Each of the curves indicates a range of impact pressures $P_2$ obtained at different nozzle pressures $P_1$ such as 90 p.s.i., 75 p.s.i., 60 p.s.i., 45 p.s.i. and 30 p.s.i. These curves were obtained by actual test and it will be noted that they are substantially straight lines. It will further be noted that the impact pressure $P_2$ drops with increase in shaft speed within a determined range for each value of nozzle pressure $P_1$. For example, with a pressure $P_1$ of 90 p.s.i., the pressure $P_2$ varies from about 73 p.s.i. at about 5 r.p.m. to about 25 p.s.i. at about 3600 r.p.m. Hence, if it is desired to control the speed of the turbine 12 at a speed of 3600 r.p.m. utilizing a pressure $P_1$ of 90 p.s.i., the pressure responsive mechanism 37 may be designed to assume control of the valve 18 at a value $P_2$ of about 25 p.s.i. It will be noted that when the speed of the shaft increases beyond 3600 r.p.m. the value $P_2$ will drop, while if the speed falls below 3600 r.p.m. the value of $P_2$ will rise in substantially a straight line.

As illustrated in FIG. 5, if the nozzle pressure $P_1$ is reduced to 75 p.s.i., the range of $P_2$ pressures is also reduced and $P_2$ attains a value of 25 p.s.i. at about 3000 r.p.m. Accordingly, the speed control may be changed merely by changing the value of $P_1$. This may be obtained, as shown in FIG. 1, by providing a bleed conduit 50 communicating with conduit 26 and having a relief valve 51 interposed therein. The relief valve 51 may be of the manually adjustable type having an adjustable handle 52 provided with a pointer 53 at its opposite end disposed in registry with a suitable dial 54. The dial 54 may be calibrated with any suitable indicia such as p.s.i. or r.p.m. With this arrangement, to change the control speed setting of the apparatus, it is merely necessary to move the handle 52 of the relief valve 51 in the desired direction to modify the nozzle fluid pressure value $P_1$. Accordingly, the adjustable relief valve 51 may be termed a "speed changer mechanism."

Alternately, the fluid pressure $P_1$ may be held at a constant value and the pressure sensing mechanism 37 may be adjusted to be actuated by different values of $P_2$. As illustrated in FIG. 1, the pressure responsive mechanism 37 is provided with a lever 57 threadedly received on the rod 43 and rotatable in one direction to increase the bias effect of the spring 44 in opposition to the pressure $P_2$ in the chamber 41, or rotatable in the opposite direction to decrease the bias effect of the spring 44.

This feature may also be more clearly understood by referring to FIG. 5. For example, with $P_1$ held constant at 90 p.s.i., assuming that the pressure responsive mechanism 37 is adjusted by the lever 57 to control the speed of the shaft 15 at 3600 r.p.m. when the $P_2$ value is 25 p.s.i., should the bias of spring 44 be increased, the valve mechanism 37 will respond to a higher pressure value of $P_2$ to control a speed lower than 3600 r.p.m. Conversely, should the sping bias be decreased by the lever 57, the pressure responsive mechanism 37 will respond to a lower value of $P_2$ and control a higher shaft speed.

From the above it will be seen that either the relief valve 51 or the pressure responsive mechanism 37 may be employed as a speed changing mechanism.

For optimum performance, when the fluid employed is a liquid, as best shown in FIG. 2, the fluid nozzle 25 should be formed to provide a long tapered bore having a thin axially extending vane 58 disposed therein to remove fluid eddies and vortices, thereby permitting the nozzle to eject the liquid in a smooth, steady jet. Also, the outlet of the fluid nozzle 25 is of a larger diameter than the diameter of the impact receiver inlet opening 30, preferably twice as large, to assure that during periods of admission of the fluid into the receiver inlet opening 30 full flow thereinto is attained.

The impact receiver 29 is preferably of conical shape with an included apical angle of at least 90 degrees, thereby permitting the excess liquid flowing in the jet to spread over the conical surface without breaking away therefrom and splashing against the vanes 33 on the disc member.

A further desirable feature resides in beveling the leading and trailing edges 47 and 48 of the vanes 33. With this arrangement, sharp cut-off of the fluid jet is obtained, thereby improving the reliability of the $P_2$ pressure values attained and improving the accuracy of control.

Figure 6:
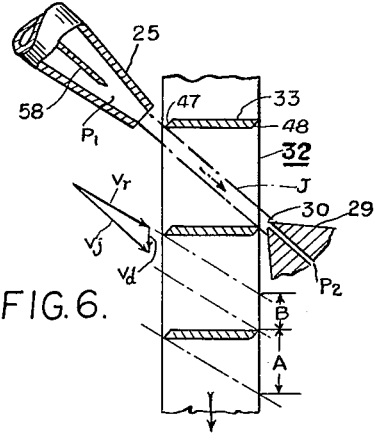
FIGS. 6 and 7 are development views similar to FIG. 4, but showing another embodiment in which the axis of the nozzle and impact receiver are disposed at an angle with the rotational axis of the disc.
Figure 7:
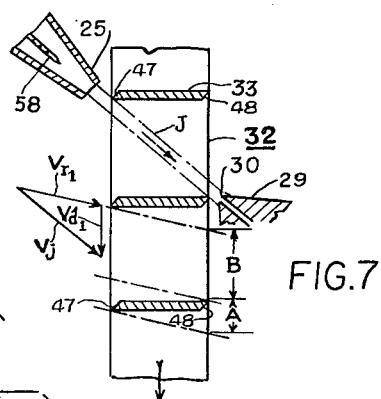

FIGS. 6 and 7 show another embodiment of the invention, wherein the fluid nozzle 25 is inclined relative to the axis of rotation of the disc member 32 so that the fluid jet issuing therefrom has a velocity component in the direction of rotation of the disc member.

Figure 8:
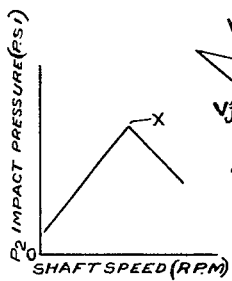
FIG. 8 is a chart showing a representative curve obtained with the embodiment shown in FIGS. 6 and 7.

The vectorial triangle shown in FIG. 6 illustrates the direction and velocity of the jet J at low speed $V_d$, as indicated by vector $V_r$, while the vectorial triangle in FIG. 7 shows the direction and velocity of the jet at a higher speed $V_{d1}$, as indicated by vector $V_{r1}$. By drawing lines parallel to vectors $V_r$ and $V_{r1}$, as explained in connection with the first embodiment, it will be seen that at low disc velocity (FIG. 6) a lower ratio of $$\frac{B}{A+B}$$

is obtained than at the higher disc velocity (FIG. 7), so that the pressure $P_2$ in the impact receiver 29 increases with speed of the disc member 32. This characteristic is graphically shown in the chart illustrated in FIG. 8. By referring to FIG. 8 it will be noted that the value of $P_2$ rises with increase in speed in substantially a straight line until a point X is attained, whereupon the inclination of the curve is reversed and the value of $P_2$ drops with further increase in speed. However, by suitably designing the structure shown in FIGS. 6 and 7 only the rising portion of the curve may be employed, if so desired.

Figure 11:
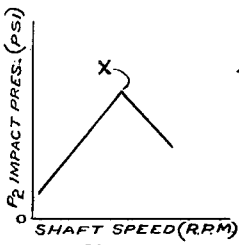
FIG. 11 is a chart showing a representative curve obtained with the embodiment shown in FIGS. 9 and 10.

FIGS. 9 and 10 show another embodiment similar to that shown in FIGS. 1 to 4 but having the vanes 33 inclined in the direction of rotation of the disc member 32. The vectorial triangle and values A and B in FIG. 9 illustrate the conditions at low speed $V_d$, while the vectorial triangle and values $A_1$ and $B_1$ in FIG. 10 illustrate the conditions at higher speed $V_{d1}$. It will be noted that the characteristics of the embodiment shown in FIGS. 9 and 10 are substantially the same as with the embodiment shown in FIGS. 6 and 7. That is, a low ratio of $$\frac{B}{A+B}$$

is obtained at low disc speed while a higher $$\frac{B_1}{A_1+B_1}$$

ratio is attained at higher speed. This characteristic is also graphically shown in FIG. 11 wherein the curve obtained is substantially similar to that shown in FIG. 8.

FIGS. 12 and 13 show an embodiment substantially the same as that shown in FIGS. 9 and 10 and differing therefrom only in that the angle of inclination of the vanes 33 is smaller than the angle of inclination of the vanes 33 in the embodiment shown in FIGS. 9 and 10. With this arrangement, the direction of rotation of the disc member 32 may be sensed, as well as the velocity of the disc member in either forward or reverse directions.

The vectorial triangle and values $A_f$ and $B_f$ shown in FIG. 12 illustrate the conditions when the disc member 32 has a speed $V_{df}$ in forward direction, while the vectorial triangle and values $A_r$ and $B_r$ in FIG. 13 illustrate the conditions when the disc member 32 is rotating in reverse direction at a speed $V_{dr}$ equal to the forward speed $V_{df}$. It will be noted that when the disc member rotates in forward direction at a velocity $V_{df}$, the relative velocity and direction of the jet J as indicated by $V_{rf}$ provides a relatively short period of deflection or interruption $A_f$ and a relatively long period $B_f$ of uninterrupted flow of the jet into the impact receiver inlet opening 30 so that a high ratio of $$\frac{B_f}{A_f+B_f}$$

is obtained. Conversely, when the disc member 32 is rotated in the reverse direction at the speed $V_{dr}$, the relative velocity and direction of the jet J, as indicated by $V_{rr}$ is inclined in the opposite direction relative to the vanes 33, so that the jet interruption period $A_r$ is considerably larger than $A_f$ while the uninterrupted jet flow period $B_r$ is considerably smaller than the flow period $B_f$. Accordingly, the ratio $$\frac{B_r}{A_r+B_r}$$

is smaller than the ratio $$\frac{B_f}{A_f+B_f}$$

The above characteristics are graphically illustrated in FIG. 14, wherein the curve Z clearly shows that when the disc member 32 is rotated in forward direction the $P_2$ values are higher than those obtained when the disc member is rotated in the reverse direction. In addition thereto, this curve further shows that when the disc rotates in the forward direction the $P_2$ value rises with an increase in speed, while when the disc rotates in the reverse direction the $P_2$ value falls with an increase in speed.

It will now be seen that the invention provides apparatus for obtaining a fluid pressure signal indicative of the rate of speed of a rotating member as well as the direction of rotation of the rotaing member. In addition thereto, the pressure $P_2$ attained in response to speed variations provides a substantially straight line curve. The curve may either rise or fall, as desired, with increasing speed by modifying the angle of inclination of the vane members 33, the direction of flow of the fluid jet from the nozzle 25 or combinations of both.

Accordingly, it will now further be seen that the invention is highly versatile and may be employed to suit any desired application where speed and/or direction of rotation of a rotatable member is to be determined or controlled.

While the invention has been shown in several forms, it will be obvious to those skilled in the art that it is not so limited, but is susceptible of various other changes and modifications without departing from the spirit thereof.

What is claimed is:

1. Apparatus including a rotatable element and a device for detecting the direction of rotation and the rotational speed of said rotating element, said device comprising a fluid pressure responsive device, a fluid pressure impact receiver providing a fluid passageway communicating at one end with said pressure responsive device and having a fluid inlet, a single nozzle member disposed in spaced axial alignment with said inlet, means for passing pressurized fluid through said nozzle toward said impact receiver inlet in a free jet, a disc member interposed between said nozzle and said inlet and rotatably driven by said rotating element, said disc member having an annular array of equally spaced radial vanes disposed about its circumferential periphery, said vanes having leading edges disposed adjacent said nozzle and trailing edges disposed adjacent said inlet, said vanes being skewed and defining an annular array of skewed passages, said passages permitting impingement of the fluid jet in said inlet and said vanes deflecting the fluid jet from said inlet during rotation of said disc member, said leading edges being in advance of said trailing edges when said disc member is driven in one direction and said trailing edges being in advance of said leading edges when said disc member is driven in the opposite direction.

2. Apparatus including a rotatable disc member and means for detecting the direction of rotation and the rotational speed of said rotatable disc member, said means comprising a fluid pressure responsive device, a fluid pressure impact receiver providing a fluid passageway communicating at one end with said pressure responsive device and having a conical plate member, said plate member having an apical portion and a fluid inlet disposed therein, a single nozzle member disposed in spaced axial alignment with said inlet, means for providing pressurized hydraulic fluid to said nozzle at a preselected pressure $P_1$, said fluid passing through said nozzle toward said impact receiver inlet in a free jet, said disc member being interposed between said nozzle and said inlet and having an annular array of flat radial vanes disposed about its circumferential periphery, said vanes having leading edges disposed adjacent said nozzle and trailing edges disposed adjacent said inlet, said vanes being skewed relative to the axis of rotation of said disc member and defining an annular array of skewed passages, said passages permitting impingement of the fluid jet in said inlet and said vanes deflecting the fluid jet from said inlet during rotation of said disc member, thereby providing an impact pressure $P_2$ in said receiver, said leading edges being in advance of said trailing edges when said disc member rotates in one direction and said trailing edges being in advance of said leading edges when said disc member rotates in the opposite direction, said $P_2$ pressure attaining a greater value when said disc member rotates in said one direction than when said disc member rotates in the opposite direction at the same rate of speed.

3. Apparatus including a rotatable disc member and means for detecting the direction of rotation and the rotational speed of said rotatable disc member, said means comprising a fluid pressure impact receiver having a conical plate portion, said plate portion having an apical portion and a fluid inlet disposed therein, a single nozzle member disposed in spaced axial alignment with said inlet, means for providing pressurized hydraulic fluid to said nozzle at a preselected pressure $P_1$, said fluid passing through said nozzle toward said impact receiver inlet in a free jet, said disc member being interposed between said nozzle and said inlet and having an annular array of flat radial vanes disposed about its circumferential periphery, said vanes having leading edges disposed adjacent said nozzle and trailing edges disposed adjacent said inlet, said vanes being skewed relative to the axis of rotation of said disc member and defining an annular array of skewed passages, said passages permitting impingement of the fluid jet in said inlet and said vanes deflecting the fluid jet from said inlet during rotation of said disc member, thereby providing an impact pressure $P_2$ in said receiver, said leading edges being in advance of said trailing edges when said disc member rotates in one direction and said trailing edges being in advance of said leading edges when said disc member rotates in the opposite direction, said $P_2$ pressure attaining a greater value when said disc member rotates in said one direction than when said disc member rotates in the opposite direction at the same rate of speed.

References Cited in the file of this patent

UNITED STATES PATENTS

| | | |
|---|---|---|
| 1,093,116 | Cubelic | Apr. 14, 1914 |
| 1,541,318 | Belluche | June 9, 1925 |
| 2,163,203 | Kegresse | June 20, 1939 |
| 2,333,044 | Rosch | Oct. 26, 1943 |
| 2,646,813 | Mueller | July 28, 1953 |
| 2,658,482 | Harris | Nov. 10, 1953 |
| 2,982,902 | Gates | May 2, 1961 |

FOREIGN PATENTS

| | | |
|---|---|---|
| 500,864 | Germany | June 27, 1930 |
| 1,004,048 | Germany | Mar. 7, 1957 |
| 1,008,750 | Germany | May 23, 1957 |